(12) United States Patent
Cohen et al.

(10) Patent No.: US 7,228,526 B2
(45) Date of Patent: Jun. 5, 2007

(54) APPLICATION IMAGING INFRASTRUCTURE

(75) Inventors: Jason Cohen, Seatac, WA (US); Ryan Burkhardt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 10/167,816

(22) Filed: Jun. 12, 2002

(65) Prior Publication Data

US 2003/0233645 A1    Dec. 18, 2003

(51) Int. Cl.
G06F 9/45    (2006.01)
(52) U.S. Cl. .................................................. 717/114
(58) Field of Classification Search ............... 717/178, 717/114, 126; 709/221
See application file for complete search history.

(56) References Cited

U.S. PATENT DOCUMENTS

| | | | |
|---|---|---|---|
| 5,142,680 A | 8/1992 | Ottman et al. | |
| 5,469,573 A | 11/1995 | McGill et al. | |
| 5,555,416 A | 9/1996 | Owens et al. | |
| 5,713,024 A | 1/1998 | Halladay | |
| 5,724,590 A * | 3/1998 | Goettelmann et al. | 717/154 |
| 5,794,052 A | 8/1998 | Harding | |
| 6,016,400 A | 1/2000 | Day et al. | |
| 6,080,207 A * | 6/2000 | Kroening et al. | 717/172 |
| 6,110,228 A | 8/2000 | Albright et al. | |
| 6,138,179 A | 10/2000 | Chrabaszcz et al. | |
| 6,188,779 B1 | 2/2001 | Baum | |
| 6,247,128 B1 | 6/2001 | Fisher et al. | |
| 6,262,726 B1 | 7/2001 | Stedman et al. | |
| 6,282,711 B1 | 8/2001 | Halpern et al. | |
| 6,286,138 B1 | 9/2001 | Purcell | |
| 6,360,365 B1 | 3/2002 | Curtis | |
| 6,374,401 B1 | 4/2002 | Curtis | |
| 6,377,958 B1 | 4/2002 | Orcutt | |
| 6,385,766 B1 | 5/2002 | Doran, Jr. et al. | |

(Continued)

FOREIGN PATENT DOCUMENTS

EP    0 817 014 A2    7/1998

(Continued)

OTHER PUBLICATIONS

Yang, "Creating the Standard Desktop Environment in a Non-Standard World," Proceedings of the 29th Annual Conference on University and College Computing Services, 2001, pp. 215-218, vol. 29, ACM Press, New York, U.S.A.

(Continued)

Primary Examiner—John Chavis
(74) Attorney, Agent, or Firm—Senniger Powers

(57) ABSTRACT

A system and method for identifying dependencies of a software program installed on a host computer prior to duplication of the software program from the host computer to a destination computer and for adapting the identified dependencies to the destination computer after duplication. An installed software program can be copied from a host computer to a destination computer without breaking portions of the image that rely on data unique to the computer context in which the software program is installed. Data structures store functionality exposed by a software program during installation of the software program that captures machine-specific data before duplication so that such machine-specific data can be restored properly after the duplication. Software of the invention processes the information in the data structures before and after the duplication process to identify and adapt, respectively, the dependencies.

34 Claims, 6 Drawing Sheets

U.S. PATENT DOCUMENTS

| | | | |
|---|---|---|---|
| 6,453,413 | B1 | 9/2002 | Chen et al. |
| 6,512,526 | B1 | 1/2003 | McGlothlin et al. |
| 6,532,474 | B2 | 3/2003 | Iwamoto et al. |
| 6,598,223 | B1 | 7/2003 | Vrhel, Jr. et al. |
| 6,681,323 | B1 | 1/2004 | Fontanesi et al. |
| 6,711,624 | B1 | 3/2004 | Narurkar et al. |
| 6,804,774 | B1 * | 10/2004 | Larvoire et al. ............... 713/2 |
| 6,868,539 | B1 | 3/2005 | Travison et al. |
| 2001/0042112 | A1 | 11/2001 | Slivka et al. |
| 2002/0156877 | A1 | 10/2002 | Lu et al. |
| 2002/0174329 | A1 | 11/2002 | Bowler et al. |
| 2002/0188941 | A1 | 12/2002 | Cicciarelli et al. |
| 2002/0194398 | A1 * | 12/2002 | Bentley et al. ............. 709/331 |
| 2003/0233379 | A1 | 12/2003 | Cohen et al. |
| 2004/0070678 | A1 | 4/2004 | Toyama et al. |
| 2004/0205406 | A1 * | 10/2004 | Kaliappan et al. ............ 714/31 |
| 2004/0218902 | A1 | 11/2004 | Yanagita |

FOREIGN PATENT DOCUMENTS

| | | |
|---|---|---|
| GB | 2 334 354 A | 2/1998 |
| WO | WO 99/49394 A1 | 9/1999 |
| WO | WO 99/59059 A1 | 11/1999 |

OTHER PUBLICATIONS

Howland, "Managing Computer Science Laboratories Using Open Software," Proceedings of the Seventh Annual Consortium for Computing in Small Colleges Central Plains Conference on the Journal of Computing in Small Colleges, 2001, pp. 117-126, The Consortium for Computing in Small Colleges, U.S.A.

Hutchinson et al., "Logical vs. Physical File System Backup," Proceedings of the Third Symposium on Operating Systems Design and Implementation, 1999, pp. 239-249, USENIX Association, California, U.S.A.

Dubose, "Manage All the Computer Labs on Campus? What Did I Do To Deserve This?" Proceedings of the 28th Annual Conference on User Services: Building the Future, 2000, pp. 74-78, ACM Press, New York, U.S.A.

Kunz et al., "The ISU Micronet Scout," Proceedings of the 25th SIGUCCS Conference on User Services: Are You Ready?, 1997, pp. 185-195, ACM Press New York, U.S.A.

Zhang et al., "A Modeling Perspective of Image-Based Installation," Dell White Paper, pp. 1-13, Mar. 2002, U.S.A.

White Paper, "Microsoft Windows 2000 Server—Remote Operating System Installation," Microsoft Corporation, pp. i-iv, 1-41, 1999, U.S.A.

Chapter 4—Installing Windows 2000 Professional, Microsoft Windows 2000 Professional Resource Kit, 30 pages, Microsoft Corporation, 2001, U.S.A.

Chapter 5—Customizing and Automating Installations, Microsoft Windows 2000 Professional Resource Kit, 61 pages, Microsoft Corporation, 2001, U.S.A.

* cited by examiner

APPLICATION IMAGING INFRASTRUCTURE

TECHNICAL FIELD

The present invention relates to the field of software duplication. In particular, this invention identifies dependencies of a software program installed on a host computer prior to duplication of the software program from the host computer to a destination computer and adapts the identified dependencies to the destination computer after duplication.

BACKGROUND OF THE INVENTION

In some prior art systems, saving, restoring, or moving a software program from one machine or computer to another breaks dependencies in the software program (e.g., encrypted sections of code or data). When installing a software program, a process takes place to integrate the software program with the computer. This integration process can break installed software programs when those installed software programs are transferred to another computer. For example, a software program with a private, encrypted database would no longer be able to access that database after the software program is transferred to another computer if the installation uses machine-specific information.

For these reasons, a system for identifying and adapting dependencies for a software program stored on a source computer-readable medium during duplication of the software program is desired to address one or more of these and other disadvantages.

SUMMARY OF THE INVENTION

The invention provides software and data structures to identify dependencies of a software program installed on a host computer prior to duplication of the software program from the host computer to a destination computer. In addition, the software and data structures of the invention adapt the identified dependencies to the destination computer after duplication. The invention includes a software image duplication technique where an installed software program can be copied from the host computer to a destination computer without breaking portions of the image that rely on data unique to the host computer by adapting the portions to rely on data unique to the destination computer after duplication. That is, the software of the invention allows a system with software such as an operating system and application programs to be imaged without breaking functionality of the installed software. The data structures of the invention store functionality exposed by a software program during installation of the software program that captures machine-specific data before duplication so that the machine-specific data can be recreated properly after the duplication. The software solution processes the information in the data structures before and after the duplication process.

In accordance with one aspect of the invention, a computerized method preserves dependencies for a software program stored on a source computer-readable medium during duplication of the software program by a host computer from the source computer-readable medium to a destination computer-readable medium of a destination computer. In particular, the method includes providing a first data structure for storing a list of one or more pre-duplication routines to be executed by the host computer prior to duplication of the software program, and a second data structure for storing a list of one or more post-duplication routines. The destination computer executes the post-duplication routines after duplication of the software program to the destination computer-readable medium.

In accordance with another aspect of the invention, a computerized method preserves dependencies for a software program stored on a source computer-readable medium during duplication of the software program by a host computer from the source computer-readable medium to a destination computer-readable medium of a destination computer. In particular, the method includes executing, on the host computer, one or more pre-duplication routines specified in a first data structure prior to duplication of the software program. Further, the method includes executing, on the destination computer, one or more post-duplication routines specified in a second data structure after duplication of the software program to the destination computer-readable medium.

In accordance with yet another aspect of the invention, a system preserves dependencies for a software program stored on a source computer-readable medium during duplication of the software program by a host computer from the source computer-readable medium to a destination computer-readable medium of a destination computer. One or more host computer-readable media store a first data structure comprising a pre-imaging field identifying one or more pre-duplication routines. The pre-duplication routines are executed by host computer prior to duplication of the software program. The one or more host computer-readable media further store a second data structure comprising a post-imaging field identifying one or more post-duplication routines. The post-duplication routines are executed by the destination computer after duplication of the software program to the destination computer-readable medium.

In accordance with yet another aspect of the invention, a computerized method identifies dependency information for a software program stored on a source computer-readable medium. The identified dependency information is used during duplication of said software program by a host computer from the source computer-readable medium to a destination computer-readable medium of a destination computer. In particular, the method includes storing in a first data structure a list of one or more pre-duplication routines to be executed by the host computer prior to duplication of the software program. Further, the method includes storing in a second data structure a list of one or more post-duplication routines to be executed by the destination computer after duplication of the software program to the destination computer-readable medium.

In accordance with yet another aspect of the invention, one or more host computer-readable media include computer-executable components. The computer-executable components preserve dependencies for a software program stored on a source computer-readable medium during duplication of the software program by a host computer from the source computer-readable medium to a destination computer-readable medium of a destination computer. In particular, the components include a storage tool associated with the host computer for providing a first data structure for storing a list of one or more pre-duplication routines. The pre-duplication routines are executed by host computer prior to duplication of the software program. The storage tool further provides a second data structure for storing a list of one or more post-duplication routines. The post-duplication routines are executed by the destination computer after duplication of the software program to the destination computer-readable medium. The computer-executable components further include a preparation module. The preparation module executes, on the host computer, the pre-duplication routines stored in the first data structure prior to duplication of the software program. The preparation module further executes, on the destination computer, the post-duplication routines stored in the second data structure after duplication of the software program to the destination computer-readable medium.

Alternatively, the invention may comprise various other methods and apparatuses. Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The invention provides software to identify dependencies of a software program installed on a host computer prior to duplication or transfer of the software program from the host computer to a destination computer and to adapt the identified dependencies to the destination computer after duplication. In general, installed software has several types of dependencies. Installed software can be dependent upon the hardware (e.g., motherboard) of the computer on which the software is installed as well as any software (e.g., drivers) associated with the hardware. In addition, a software program can be dependent upon other software in the context in which the software program is installed. As used herein, the dependency of software includes dependencies on hardware and/or dependencies on other software.

The invention provides a process of preparing a software program to be hardware independent or otherwise independent of computer context when being duplicated from one hardware context to another, from one software context to another, and/or when the hardware or software relating to the software program is being modified. Each component of the software program prepares itself for a change in computer context (e.g., a change in security data specific to each computer) by calling into object code provided by the software program before and after duplication. For example, the invention software allows the software program to prepare itself before and after a system security identification (SID) has changed. Other machine-specific dependency data includes, but is not limited to, private encryption keys, a computer name, and a domain or workgroup name. Although the software program becomes independent of hardware and software context prior to duplication, the software program is adapted to the context of the destination computer after duplication. Alternatively or in addition, the software program resets user configuration data prior to duplication. That is, the preparation process of the invention prepares software for duplication or imaging as well as for migration to new hardware and/or a new user. For example, the software program may want to reset or clean up configuration data such as timers. Further, the software program may set a flag so that, upon the first execution of the software program, the software program prompts the user to provide information that was obtained during the installation of the software program originally (e.g., during setup). For example, the software program may want to ask for the user's name and initials.

Figure 1:
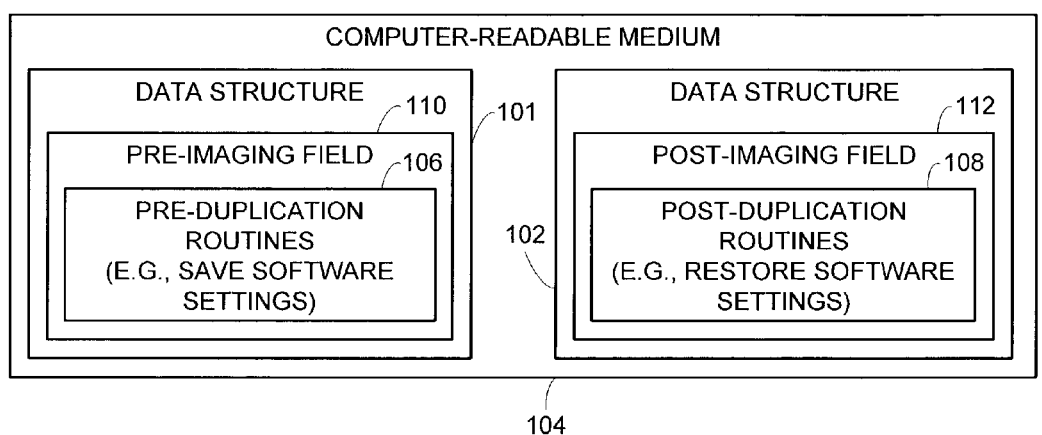
FIG. 1 is an exemplary block diagram illustrating data structures for storing a list of pre-duplication routines and a list of post-duplication routines.

Referring first to FIG. 1, an exemplary block diagram illustrates data structures 101, 102 for storing a list of pre-duplication routines 106 and a list of post-duplication routines 108. In one embodiment, an operating system provides the data structures 101, 102. The data structures 101, 102 are stored on a computer-readable medium (CRM) 104. Data structure 101 includes a pre-imaging field 110 storing a list of one or more pre-duplication routines 106. A host computer executes the pre-duplication routines 106 prior to duplicating a software program to a destination computer. Data structure 102 includes a post-imaging field 112 storing a list of one or more post-duplication routines 108. The destination computer executes the post-duplication routines 108 after duplication of the software program. In one embodiment, the data structures 101,102 also identify at least one library in which the listed pre-duplication routines 106 and the listed post-duplication routines 108 may be found.

For example, the pre-duplication routines 106 may be identified by Routine_reimage_1 and the post-duplication routines 108 may be identified by Routine_postimage_1. The routines 106,108 include sets of actions taken to make the software work correctly after duplication. For example, Routine_preimage_1 may include a function call such as copy_data( ) that copies machine-specific data used at install time to a computer-readable medium. Further, Routine_postimage_1 may include function calls such as decrypt_information( ) and encrypt_information( ). Decrypt_information( ) executes to decrypt information using the machine-specific data stored using the copy_data( ) function call. Encrypt_information( ) executes to encrypt information using the destination computer's specific data.

In another embodiment, in addition to storing the name of the library and a list of one or more routines, the data structures 101,102 store ordering information to identify the order in which the pre-duplication routines 106 and/or the post-duplication routines 108 are to be executed. For example, if two application programs are dependent on each other, each of the application programs can store ordering information in the data structures 101,102 to guarantee that certain pre-duplication routines 106 and/or post-duplication routines 108 are executed before or after other routines.

In another embodiment, there may be several phases of integration after duplication of software and booting of a destination computer. The data structures 101,102 store further information provided by the application programs identifying which phase in which to execute specific post-duplication routines 108. For example, a specific post-duplication routine 108 may need to be executed after a specific service has been initialized.

In one embodiment, the pre-duplication routines 106 include computer-executable instructions for preserving dependencies or system settings of a software program prior to duplication. The system settings are, for example, stored in a system registry. Similarly, the post-duplication routines 108 include computer-executable instructions for restoring the preserved system settings of the software program on a destination CRM (such as destination CRM 614 in FIG. 6) after duplication of the software program to the destination CRM. In another embodiment, the invention provides a registry which is populated with a list of software routines from the software program that are executed to store all the configuration information affected by a change in computer context.

The data structures illustrated in FIG. 1 can be provided, for example, by a storage tool such as illustrated and described with reference to FIG. 2.

Figure 2:
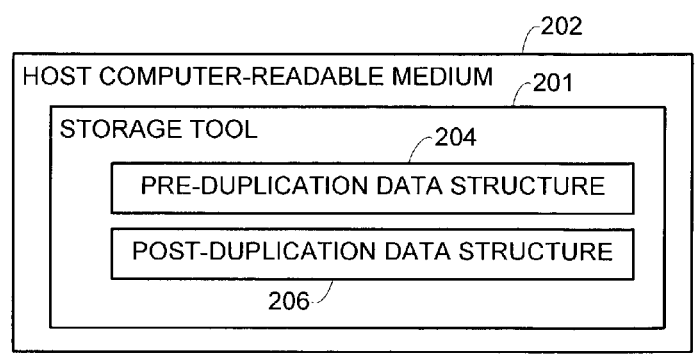
FIG. 2 is an exemplary block diagram illustrating the storage tool providing a pre-duplication data structure and a post-duplication data structure.
Figure 9:
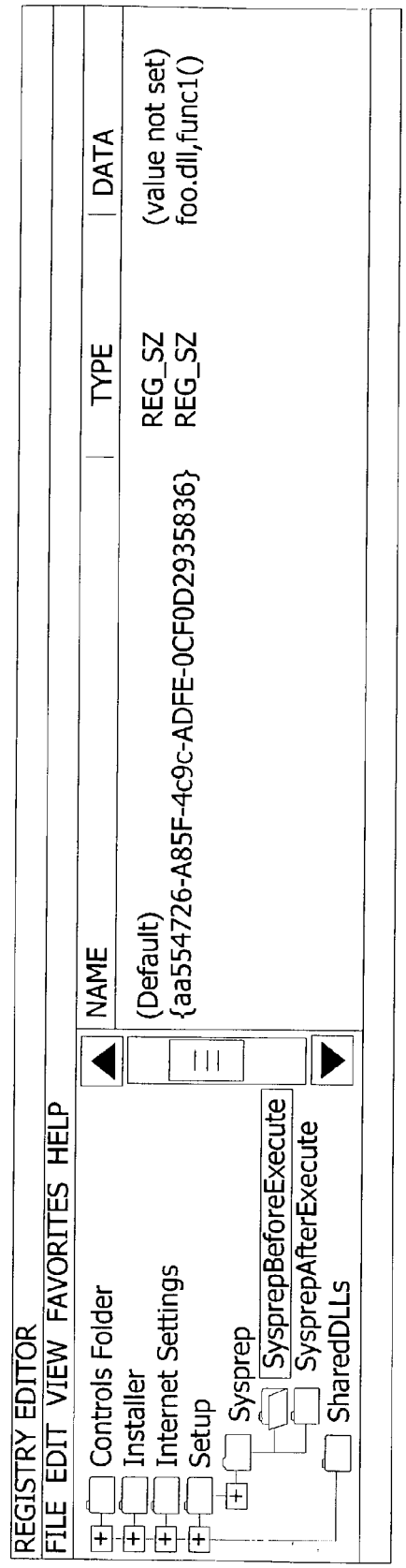
FIG. 9 is a screen shot of the user interface for one exemplary embodiment of the invention illustrating the data structures for storing the lists of pre-duplication and post-duplication routines.

Referring next to FIG. 2, an exemplary block diagram illustrates the storage tool 201 that provides the pre-duplication data structure 204 and the post-duplication data structure 206. In one embodiment, the storage tool 201 is stored on a host CRM 202 such as CRM 104. The storage tool 201 provides the pre-duplication data structure 204 (e.g., data structure 101) for storing the list of one or more pre-duplication routines 106 to the host CRM 202. The storage tool 201 also provides the post-duplication data structure 206 (e.g., data structure 102) for storing the list of one or more post-duplication routines 108 to the host CRM 202. As described in greater detail below, FIG. 9 illustrates a screen shot of a user interface for one exemplary embodiment of the invention.

In the exemplary embodiment of FIGS. 1-8, the host CRM 202 stores the software program to be duplicated by the host computer and stores the data structures 204, 206. Those skilled in the art will appreciate that the software program and/or the data structures 204, 206, 706 may be stored on at least one other CRM, such as a source CRM, accessible by the host computer.

Figure 3:
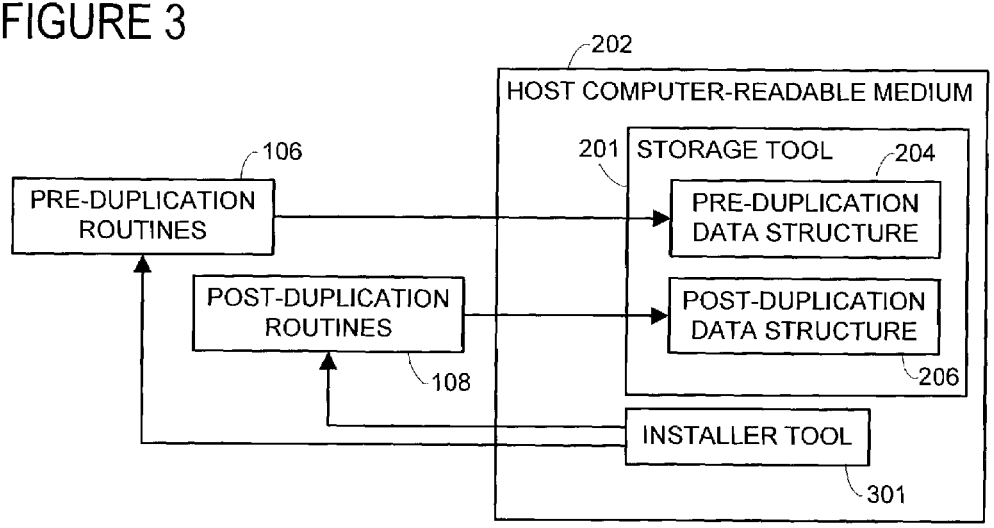
FIG. 3 is an exemplary block diagram illustrating the installer tool storing a list of pre-duplication routines and a list of post-duplication routines in the data structures provided by the storage tool.

Referring next to FIG. 3, an exemplary block diagram illustrates an installer tool 301 storing software routines in the data structures provided by the storage tool 201. More specifically, the installer tool 301 stores the pre-duplication routines 106 and post-duplication routines 108 in the pre-duplication data structure 204 and post-duplication data structure 206, respectively, provided by the storage tool 201. During installation of software by the installer tool 301, the installer tool 301 stores one or more routines that are to be executed before (e.g., in the pre-duplication data structure 204) and after (e.g., in the post-duplication data structure 206) a machine-specific change, edit, or other event is about to be made.

In one embodiment, software vendors or developers provide the installer tool 301 for each software program to be installed. Each installer tool 301 is operable with one or more of the software programs. In the embodiment of FIG. 3, the installer tool 301 is stored on the host CRM 202 for execution by the host computer. For example, the installer tool 301 may have been installed or otherwise copied to the host CRM 202. In another embodiment, the installer tool 301 is stored on a removable CRM such as a CD-ROM or DVD-ROM accessible by the host computer for execution. For example, the installer tool 301 may be stored on the CRM storing the software program to be installed. The operation of the installer tool 301 is described in detail with respect to FIG. 4.

Figure 4:
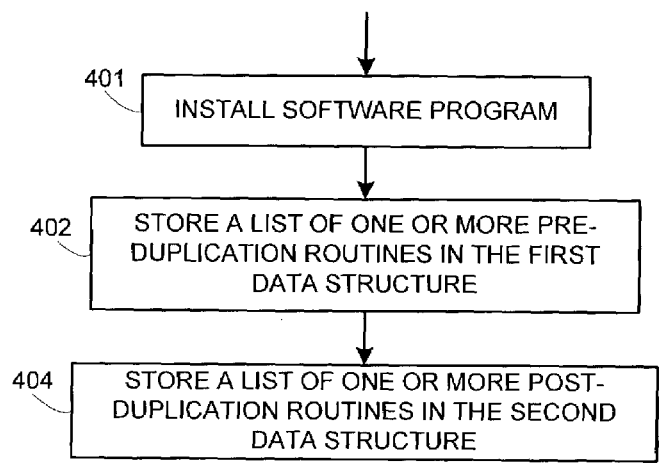
FIG. 4 is a flow chart illustrating exemplary operation of the installer tool.

Referring next to FIG. 4, an exemplary flow chart illustrates operation of the installer tool 301. A user installs a software program on a host computer at 401. During installation of the software program onto the host computer, the installer tool 301 stores the list of one or more pre-duplication routines 106 in the first data structure at 402. Also during installation, the installer tool 301 stores a list of one or more post-duplication routines 108 in the second data structure at 404.

Figure 5:
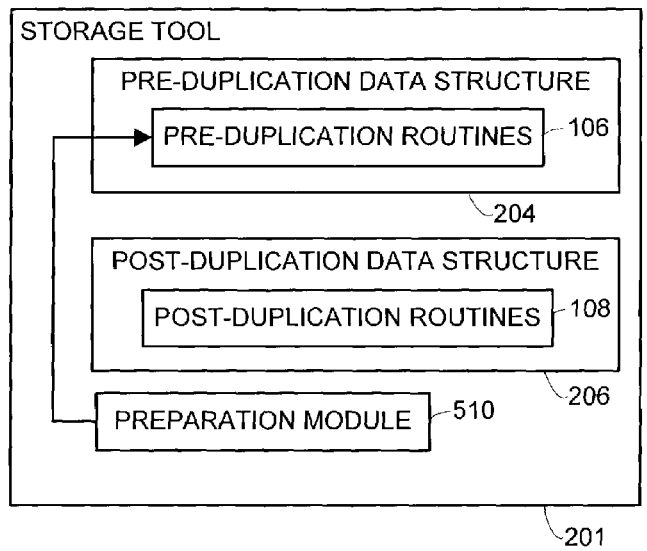
FIG. 5 is an exemplary block diagram illustrating the preparation module executing the pre-duplication routines listed in the pre-duplication data structure.

Referring next to FIG. 5, an exemplary block diagram illustrates a preparation module 510 executing the pre-duplication routines 106 listed in the pre-duplication data structure 204. The storage tool 201 (as described with respect to FIG. 2) is associated with the host computer and provides a pre-duplication structure 204 and a post-duplication data structure 206 for storing the list of one or more pre-duplication routines 106 and the list of one or more post-duplication routines 108, respectively. In one embodiment, the storage tool 201 further provides the preparation module 510. The preparation module 510 executes, on the host computer, the pre-duplication routines 106 stored in the pre-duplication data structure 204 prior to duplication of the software program. Moreover, as discussed in greater detail below with respect to FIG. 7, some or all of the functionality of the preparation module 510 is transferred to the destination CRM for future execution as preparation module 708. In one embodiment, the preparation module 510, 708 executes in response to user input. For example, the preparation module 510, 708 may be part of system preparation software functionality that executes on the host computer prior to duplication of software.

In another embodiment, the storage tool 201 executes in response to user input. The host computer executes the pre-duplication routines 106 to collect dependency information relating to dependencies between the software program and the host computer. For example, the dependencies include, but are not limited to, system settings and security identification data specific to the host computer. Generally, the dependency information includes any setting created using information specific to installed hardware or software or machine-specific software settings. That is, the dependency information relates to any information based on the computer hardware or a software setting that might change when duplicating or transferring the software program to another computer. For example, the dependency information may relate to a computer name, network settings (e.g., a domain), a size of a mass storage device, or a name of a user account.

It will be appreciated by those skilled in the art that any amount of time may pass between the population of the data structures 204, 206 and the operation of the preparation module 510. For example, a software program may be imaged immediately after installation on the host CRM 202 or a few years after installation on the host CRM 202.

Figure 6:
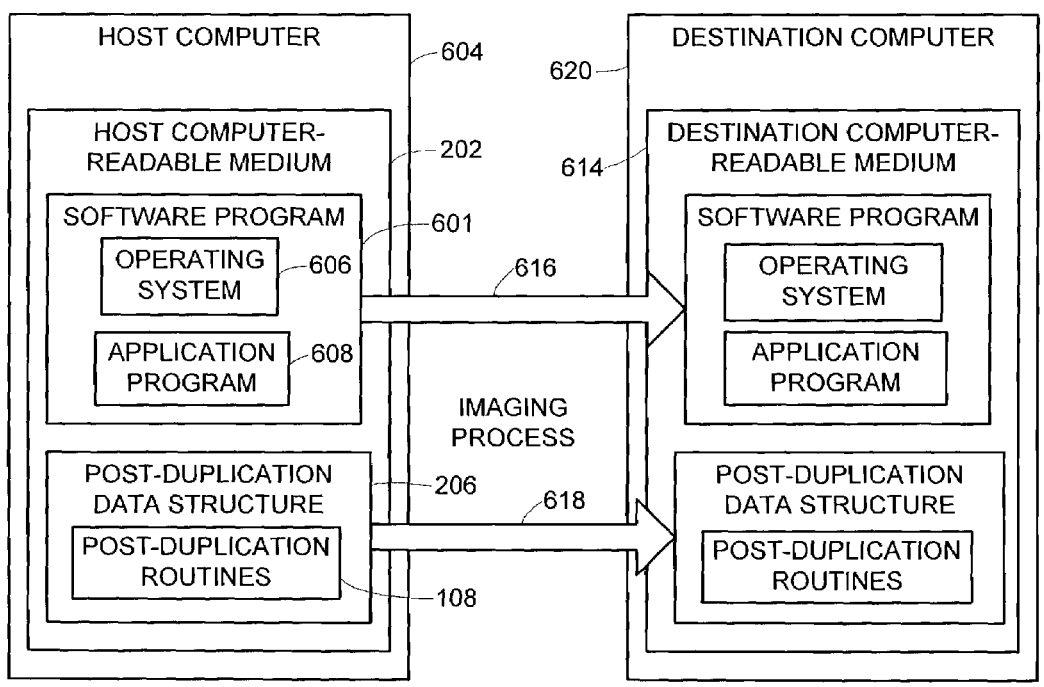
FIG. 6 is an exemplary block diagram illustrating the imaging process to duplicate a software program and a post-duplication data structure from the host computer to the destination computer.

Referring next to FIG. 6, an exemplary block diagram illustrates an imaging process for duplicating a software program 601 and the post-duplication data structure 206 from a host computer 604 to a destination computer 620. The software program 601 to be duplicated is stored, for example, on a host CRM 202 associated with host computer 604. As discussed above, the software program 601 can be an operating system 606 (e.g., operating system 144, 170 as described with respect to FIG. 10), or an application program 608 (e.g., application program 146, 172 as described with respect to FIG. 10), or both. Furthermore, a post-duplication data structure 206 storing a list of one or more post-duplication routines 108 is also stored, for example, on the host CRM 202. The duplication includes imaging the software program 601 and the post-duplication routines 108 to the destination CRM 614, as shown by reference characters 616, 618 respectively. The software program 601 and the post-duplication routines 108 are then integrated with the destination computer 620 by performing at least one of the post-duplication routines on the destination computer 620. The software program 601 is duplicated from the host CRM 202 to the destination CRM 614 via an imaging process. Those skilled in the art will note that the imaging process includes any process for copying the software program 601 from one CRM to another including, but not limited to, copying files of the software program 601 or imaging blocks of data comprising the software program 601.

Figure 7:
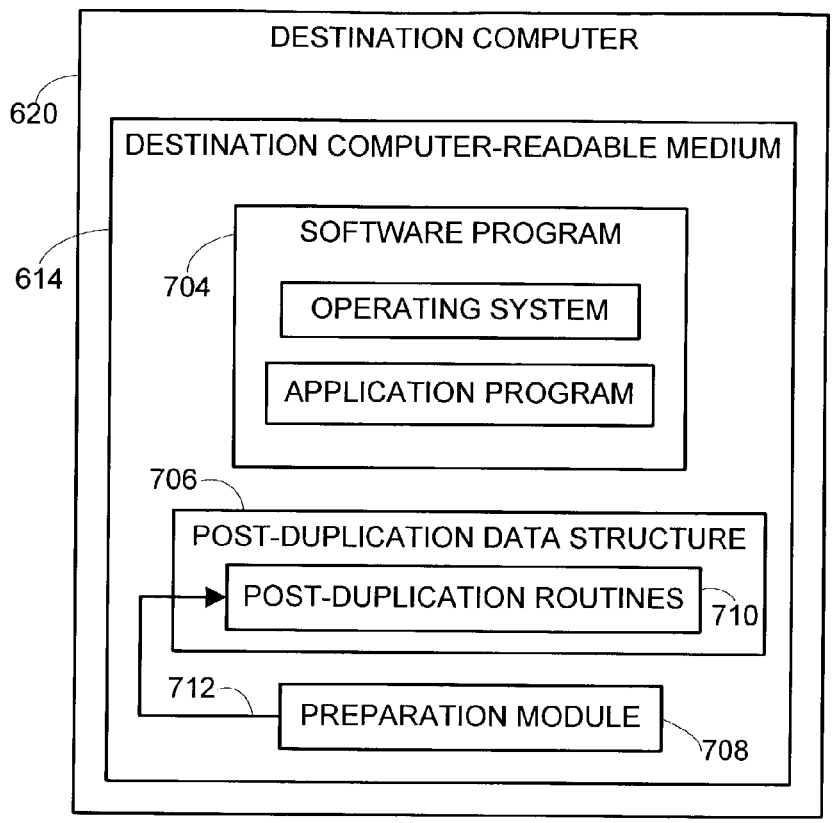
FIG. 7 is an exemplary block diagram illustrating the preparation module executing the post-duplication routines listed in the post-duplication data structure.

Referring next to FIG. 7, an exemplary block diagram illustrates a preparation module 708 executing the post-duplication routines 710 listed in the post-duplication data structure 706. The destination CRM 614 is associated with the destination computer 620, and includes a duplicated software program 704, a duplicated post-duplication data structure 706, and the preparation module 708. The software program 704 and post-duplication structure 706 are integrated with the destination computer 620 by performing at least one of the post-duplication routines 710. The preparation module 708 accomplishes this integration by executing at 712 the post-duplication routines 710. The destination computer 620 executes the post-duplication routines 710 via the preparation module 708 to retrieve the saved dependency information and to recreate the dependencies between the software program 704 and the destination computer 620. For example, the destination computer 620 generates security information specific to the destination computer 620 using hashes generated by hardware of the destination computer 620 prior to executing the post-duplication routines 710. Recreating the dependencies then includes generating data based on the newly-generated security information for the imaged software program 704 that was dependent on security information from the previous computer context.

It will be appreciated by those skilled in the art that the preparation module 708 and/or the post-duplication data structure 706 can be stored on a CRM accessible by the destination computer 620 to provide the functionality described herein.

Figure 8:
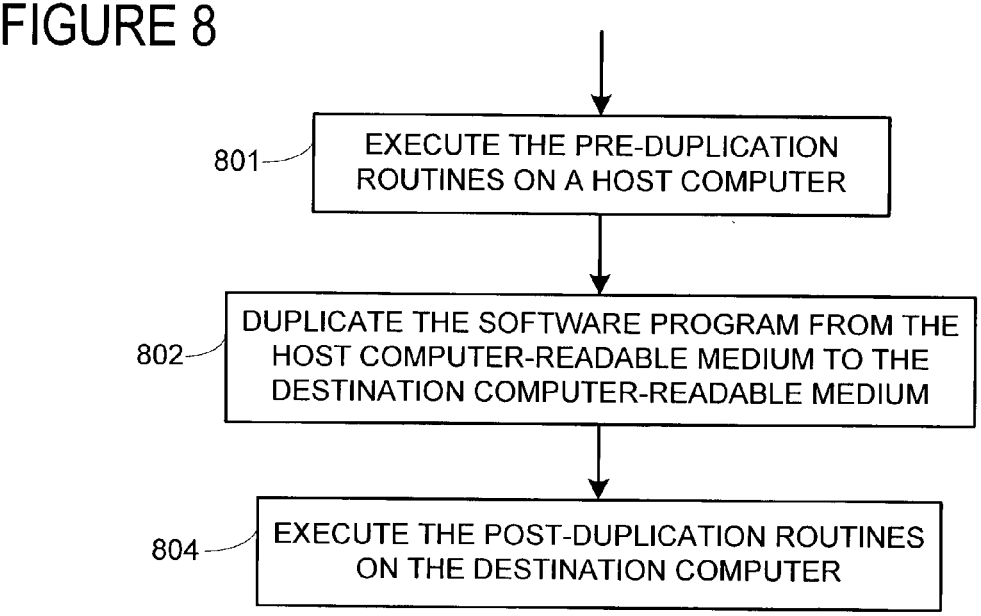
FIG. 8 is a flow chart illustrating exemplary operation of the system preparation tool.

Referring next to FIG. 8, an exemplary flow chart illustrates of the system preparation module 708. The preparation module 708 executes the pre-duplication routines 106 on the host computer 604 at 801. An imaging process duplicates the software program 601 at 802 from the host CRM 202 to the destination CRM 614. The preparation module 708 then executes the post-duplication routines 710 on the destination computer 620 at 804.

In a secure embodiment of the invention, only an administrator of the host computer 604 can execute the software routines identified in the data structures and execute the preparation tool. In another embodiment, each software program 601 is responsible for writing to the data structures the entry points and object code components for the software program 601. In yet another embodiment, the preparation tool verifies the integrity of the entry point or the object code component.

Figure 10:
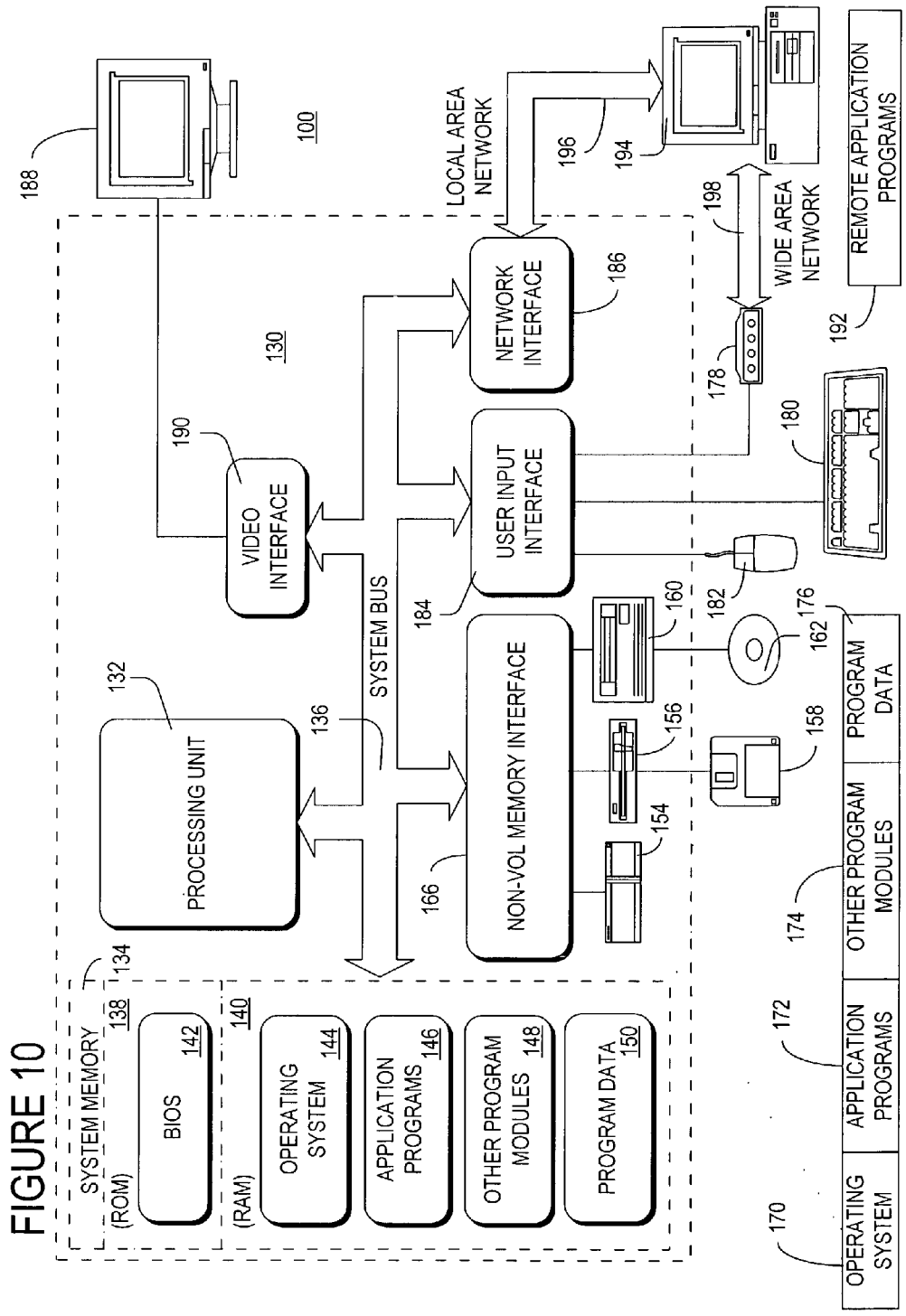
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer-readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, the host computer 604 such as computer 130 executes computer-executable instructions such as those illustrated in FIG. 4 to store a list of one or more software routines in one or more data structures. Similarly, the destination computer 620 and/or the host computer 604 such as computer 130 execute computer-executable instructions such as those illustrated in FIG. 8 to execute the pre-duplication routines 106 prior to duplication and execute the post-duplication routines 710 after duplication.

The following examples illustrate the invention.

Exemplary post-duplication routines such as post-duplication routines 108, 710 include, but are not limited to, regenerating SIDS, encrypting private keys, and updating other settings specific to computer context. For example, in image.dll, the pre-duplication routine 106 is copySID( ), and the post-duplication routine 108 is newSID( ). In this example, the preparation module 510 executes copySID( ) prior to imaging to generate and store the SID (e.g., 0xefff). After imaging the software related to image.dll, the preparation module 708 executes newSID( ) to decrypt using the stored SID (e.g., 0xefff) and encrypt using the new SID for the destination computer 620. In this example, the data structures appear as follows, using a registry as a specific example of the data structures. Those skilled in the art will note that the use of a registry is merely exemplary, and that it is contemplated by the inventors that the data structures may be implemented in many ways known within the art to identify pre-duplication routines 106 and post-duplication routines 108.

```
HKLM\SW\US\Sysprep\BeforeImage
   INFO=image.dll,copySID( )
HKLM\SW\US\Sysprep\AfterImage
   INFO=image.dll,newSID( )
```

In another example, in appfix.dll, the pre-duplication routine 106 is reset_timers( ) and the post-duplication routine 108 is set_timers( ). In this example, the preparation module 510 executes reset_timers( ) to delete a system setting indicative of the date of installation for the software related to appfix.dll. After imaging the software, the preparation module 708 executes set_timers( ) to create a system setting reflecting a current date as the date of installation for the software. In this example, the data structures appear as follows, using a registry as a specific example of the data structures.

```
HKLM\SW\US\Sysprep\BeforeImage
   INFO=appfix.dll,reset_timers( )
HKLM\SW\US\Sysprep\AfterImage
   INFO=appfix.dll,set_timers( )
```

In the following example, the object code components of the software program 601 are referred to as dynamic-link libraries (DLLs). In addition, the pre-duplication data structure 204 and the post-duplication data structure 206 are embodied as keys in a registry.

The preparation module 510 calls out to any external DLLs which are necessary for the third party application programs to store away any information that requires the use of SIDs relating to the host computer 604. After the destination computer 620 is rebooted, the application programs call into their DLLs to apply the SIDs related to the destination computer 620 to all of the information that is dependent on SIDs.

Exemplary operation of the invention is next described. A user installs the software program 601 (e.g., an application program) on the host computer 604. The installer program associated with the software program 601 populates the appropriate registry keys with the DLLs and entry points for the DLLs. As illustrated in FIG. 9, when the software program 601 is installed, the installer tool 301 will create two registry keys under HKLM\Software\CurrentVersion\Setup\PreparationModule called BeforeExecute and AfterExecute. By default, each of these keys will not contain any information. The BeforeExecute key stores DLL entry points for software programs (such as software program 601) that need to save any information before the SIDs have changed. The AfterExecute key stores DLL entry points for software programs (such as software program 704) that need to restore all the saved information after the SIDs have changed.

When the host computer 604 is prepared for imaging, the preparation tool checks the appropriate registry key and calls into the entry points of all the DLLs specified in the registry keys to back up any information dependent on the context of the host computer 604. For example, such information may be dependent on the SIDs of the host computer 604.

The software program 601 is then imaged and applied to the destination computer 620. On the next reboot of the destination computer 620, the context for the destination computer 620 is generated. For example, new, unique SIDs may be generated. The preparation module 708 (or the underlying operating system) calls the restore entry points for the software programs 704 that have registered themselves with the operating system. In addition, the preparation module 708 (or the underlying operating system) calls into the restore hooks that will restore all the settings that the software program 601, 704 had previously saved.

Exemplary formats for the pre-duplication data structure 204 and the post-duplication data structure 206 are next described. Each software program 601 will write a separate globally unique identifier (GUID) of type Reg_sz for each of the DLL entry point that need to be specified. The data for each of the GUIDs specified in the registry will store the DLL name followed by one or more entry points for that DLL. If there are multiple entry points for that DLL, then the entry points can be specified as values in the registry in the order they need to be called (if the registry supports such ordering). The following table illustrates a key name, type, and data for the key. In the following example, func1( ) will be called before func2( ) if the registry supports such ordering.

| Name of value of Reg key | Type | Data |
| --- | --- | --- |
| {AA554726-A85F-4c9c-ADFE-0CF0D2935836} | Reg_SZ | Xyz.dll,func1,func2 |

In this example, whenever the preparation module 510 executes to prepare the software program 601 for imaging, the entry points for the above software program 601 identified by the unique GUID will be called. As described herein, the software program 601 is responsible for writing the DLL calls. The preparation module 510 only calls into those entry points provided in the registry key. In an embodiment in which the registry does not support any notion of ordering, if any of the software programs 601 want to order the execution of the different entry points, then that software program 601 lists one common DLL calling different entry points and different DLLs if need be. This one single common entry point may or may not call into other DLLs which restore or backup information. In one embodiment, it is only possible for the software program 601 to order the entry points within the DLLs of that software program 601. If func2( ) was omitted from the above table, Xyz.dll would be the only DLL which has one single common entry point which calls all the other necessary entry points. That is, func1( ) would then call func2( ).

In one embodiment, the invention supports pairing between routines in the BeforeExecute key and in the AfterExecute key. That is, if the software program 601 (or the installer tool 301 associated with the software program 601) writes to the BeforeExecute key, then the software program 601 should write appropriate entry points to the AfterExecute key. If not, an error is logged identifying various items including, but not limited to, the software program 601 with its GUID, name of installer program, and the DLL called.

In another embodiment, the invention does not provide linkage between routines in the BeforeExecute key and the AfterExecute key. For example, a routine in the BeforeExecute key that removes certain machine-specific data that is automatically regenerated the next time the software program is run does not have or need a corresponding routine in the AfterExecute key. In another example, an AfterExecute key such as ResetTimers( ) that removes timer information on the next boot after duplication of the software program does not have or need a corresponding routine in the BeforeExecute key.

The preparation module 510 executes the routines listed in the BeforeExecute key when the user wants to prepare the software program 601 for imaging. If the computer context has not been changed after imaging and applying the image, then the preparation module 708 in one embodiment does not execute the routines listed in the AfterExecute key. Alternatively or in addition, periodically executing backup routines listed in the BeforeExecute key provides a measure of safety by saving information critical to the software program 601. The saved, critical information may later be restored should a failure occur.

During execution of the preparation module 510, 708, a suitable error code will be logged in a file such as setuperr.log if a failure occurs (e.g., if any of the DLL entry points fail). The logged information includes the GUID of the relevant software program 601 and the appropriate DLL. However, the execution of the preparation module 510, 708 will continue despite any errors encountered while executing the routines listed in the BeforeExecute key and the AfterExecute key.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. In a system for imaging a software program by copying files or imaging blocks of data by a host computer from a source computer-readable storage medium to a destination computer-readable storage medium of a destination computer, the system performing a method comprising:

identifying dependencies of the software program prior to imaging of the software program, said dependencies including settings specific to the software program and the host computer;

defining one or more pre-duplication routines including computer-executable instructions for preserving the identified dependencies of the software program;

providing a first data structure for storing a list of the one or more defined pre-duplication routines to be executed by the host computer prior to imaging of the software program to the destination computer-readable storage medium of the destination computer;

defining one or more post-duplication routines including computer-executable instructions for configuring the software program on the destination computer as a function of the settings included in the identified dependencies; and providing a second data structure for storing a list of the one or more defined post-duplication routines to be executed by the destination computer after imaging of the software program to the destination computer-readable storage medium of the destination computer.

2. The method of claim 1, wherein the software program comprises an operating system or an application program or both.

3. The method of claim 1, wherein the pre-duplication routines and the post-duplication routines are associated with the software program.

4. The method of claim 1, further comprising storing in a first data structure the list of pre-duplication routines to be executed by the host computer prior to imaging of the software program.

5. The method of claim 4, further comprising executing, on the host computer, the pre-duplication routines stored in the first data structure.

6. The method of claim 1, further comprising storing in a second data structure the list of post-duplication routines to be executed by the destination computer after imaging of the software program to the destination computer-readable storage medium.

7. The method of claim 6, further comprising imaging the software program to the destination computer-readable storage medium.

8. The method of claim 7, further comprising executing, on the destination computer, the post-duplication routines stored in the second data structure after said imaging.

9. The method of claim 8, further comprising rebooting the destination computer prior to executing, on the destination computer, the post-duplication routines.

10. The method of claim 1, wherein executing the post-duplication routines comprises generating security identification data for the imaged software program.

11. The method of claim 1, wherein executing the pre-duplication routines comprises storing one or more settings for the software program on a computer-readable storage medium accessible by the destination computer.

12. The method of claim 11, wherein executing the post-duplication routines comprises restoring the stored settings.

13. The method of claim 1, wherein one or more computer-readable storage media have computer-executable instructions for performing the method of claim 1.

14. The method of claim 1, further comprising imaging, by the host computer, blocks of data from the source computer-readable storage medium to the destination computer-readable storage medium to image the software program on the destination computer, said blocks of data containing the software program.

15. A method for identifying dependencies of a software program stored on a source computer-readable storage medium prior to imaging of said software program by copying files or imaging blocks of data by a host computer from said source computer-readable storage medium to a destination computer-readable storage medium of a destination computer to adapt said identified dependencies to the destination computer after imaging, said method comprising:

- identifying dependencies of the software program prior to imaging of the software program, said dependencies including settings specific to the software program and the host computer;
- defining one or more pre-duplication routines including computer-executable instructions for preserving the identified dependencies of the software program;
- executing, on the host computer, the defined one or more pre-duplication routines specified in a first data structure prior to imaging of the software program to the destination computer-readable storage medium of the destination computer;
- defining one or more post-duplication routines including computer-executable instructions for configuring the software program on the destination computer as a function of the settings included in the ider)tified dependencies; and
- executing, on the destination computer, the define one or more post-duplication routines specified in a second data structure after imaging of the software program to the destination computer-readable storage medium of the destination computer.

16. The method of claim 15, wherein the source computer-readable storage medium is associated with a source computer, wherein the pre-duplication routines, when executed by the host computer, save dependency information to the source computer-readable storage medium, said dependency information relating to one or more dependencies between the software program and the source computer, and wherein the post-duplication routines, when executed by the destination computer, recreate the dependencies between the software program and the destination computer based on the saved dependency information.

17. The method of claim 15, wherein the software program comprises an operating system or an application program or both.

18. The method of claim 15, wherein said executing on the host computer comprises executing, on the host computer, one or more pre-transfer routines specified in a first data structure prior to transfer of the software program, and wherein said executing on the destination computer comprises executing, on the destination computer, one or more post-transfer routines specified in a second data structure after transfer of the software program to the destination computer-readable storage medium.

19. The method of claim 15, wherein said executing on the host computer comprises executing, on the host computer, the one or more pre-duplication routines to reset configuration information specific to the host computer.

20. The method of claim 15, wherein one or more computer-readable storage media have computer-executable instructions for performing the method of claim 15.

21. One or more host computer-readable storage media in a system for identifying dependencies of a software program stored on a source computer-readable storage medium prior to imaging of said software program by copying files or imaging blocks of data by a host computer from said source computer-readable storage medium to a destination computer-readable storage medium of a destination computer, said system adapting said identified dependencies to the destination computer after imaging, said host computer-readable storage media having stored thereon:

- a first data structure comprising a pre-imaging field identifying one or more pre-duplication routines to be executed by the host computer prior to imaging of the software program to the destination computer-readable storage medium of the destination computer, said pre-duplication routines, including computer-executable instructions for preserving the identified dependencies of the software program, wherein said dependencies including settings specific to the software program and the host computer; and
- a second data structure comprising a post-imaging field identifying one or more post-duplication routines to be executed by the destination computer after imaging of the software program to the destination computer-readable storage medium of the destination computer, said post-duplication routines, being executed on the destination computer, including computer-executable instructions for configuring the software program on the destination computer as a function of the identified dependencies.

22. The computer-readable storage media of claim 21, wherein the pre-duplication routines and the post-duplication routines are associated with one or more object files of the software program.

23. The computer-readable storage media of claim 21, wherein the software program comprises an operating system or an application program or both.

24. A method for identifying dependency information for a software program stored on a source computer-readable storage medium for use during imaging of said software program by copying files or imaging blocks of data by a host computer from said source computer-readable storage medium to a destination computer-readable storage medium of a destination computer, said method comprising:

- collecting dependencies of the software program, said dependencies including settings specific to the software program and the host computer;
- generating one or more pre-duplication routines including computer-executable instructions for preserving the collected dependencies of the software program;
- storing in a first data structure a list of the one or more generated pre-duplication routines to be executed by the host computer prior to imaging of the software program;
- generating one or more post-duplication routines including computer-executable instructions for configuring the software program on the destination computer based on the collected dependencies; and
- storing in a second data structure a list of the one or more generated post-duplication routines to be executed by the destination computer after imaging of the software program onto the destination computer-readable storage medium.

25. The method of claim 24, wherein storing in a first data structure and storing in a second data structure occur during installation of the software program onto the source computer-readable storage medium.

26. The method of claim 24, wherein the software program comprises an operating system or an application program or both.

27. The method of claim 24, wherein said storing in a first data structure comprises storing in a first data structure a list of one or more pre-transfer routines to be executed by the host computer prior to transfer of the software program, and wherein said storing in a second data structure comprises storing in a second data structure a list of one or more post-transfer routines to be executed by the destination computer after transfer of the software program to the destination computer-readable storage medium.

28. The method of claim 24, wherein said storing in a first data structure further comprises storing ordering information in the first data structure to identify an order of execution for the pre-duplication routines.

29. The method of claim 24, wherein said storing in a second data structure further comprises storing ordering information in the second data structure to identify an order of execution for the post-duplication routines.

30. The method of claim 24, wherein one or more computer-readable storage media have computer-executable instructions for performing the method of claim 24.

31. One or more host computer-readable storage media having computer-executable components for identifying dependencies of a software program stored on a source computer-readable storage medium prior to imaging of said software program by copying files or imaging blocks of data by a host computer from said source computer-readable storage medium to a destination computer-readable storage medium of a destination computer, said components adapting said identified dependencies to the destination computer after imaging, said components comprising:

a storage tool associated with the host computer for providing a first data structure for storing a list of one or more pre-duplication routines to be executed by the host computer prior to imaging of the software program, said one or more pre-duplication routines including computer-executable instructions for preserving the identified dependencies of the software program, said dependencies including settings specific to the software program and the host computers said storage tool further providing a second data structure for storing a list of one or more post-duplication routines to be executed by the destination computer after imaging of the software program to the destination computer-readable storage medium, said one or more post-duplication routines including computer-executable instructions for configuring the software program on the destination computer as a function of the identified dependencies; and a preparation module for executing, on the host computer, the pre-duplication routines stored in the first data structure prior to imaging of the software program, said preparation module further executing, on the destination computer, the post-duplication routines stored in the second data structure after imaging of the software program to the destination computer-readable storage medium.

32. The computer-readable storage media of claim 31, further comprising an installer tool for storing the list of pre-duplication routines in the first data structure, said installer tool further storing the list of post-duplication routines in the second data structure.

33. The computer-readable storage media of claim 32, wherein the installer tool stores the list of pre-duplication routines in the first data structure and stores the list of post-duplication routines in the second data structure during installation of the software program onto the source computer-readable storage medium.

34. The computer-readable storage media of claim 31, wherein the software program comprises an operating system or an application program or both.

\* \* \* \* \*